United States Patent
Liao et al.

[11] Patent Number: 6,122,164
[45] Date of Patent: Sep. 19, 2000

[54] SHOCK ABSORBING SPACERS FOR PORTABLE COMPUTER HARD DISC DRIVES

[75] Inventors: Reynold Liao, Austin; Sean O'Neal, Round Rock, both of Tex.

[73] Assignee: Dell USA, L.P., Round Rock, Tex.

[21] Appl. No.: 09/174,204

[22] Filed: Oct. 16, 1998

[51] Int. Cl.[7] .............................. H05R 3/00; F16M 13/00; F16M 1/00; F16M 3/00; F16M 5/00
[52] U.S. Cl. .......................... 361/685; 361/685; 248/500; 248/634; 248/636; 248/638; 369/75.2; 369/76
[58] Field of Search .......................... 361/685; 248/500, 248/638, 636, 634; 369/75.2, 76

[56] References Cited

U.S. PATENT DOCUMENTS

| | | | |
|---|---|---|---|
| 4,937,806 | 6/1990 | Babson et al. | 369/75.1 |
| 5,543,609 | 8/1996 | Giordano et al. | 235/462 |
| 5,596,484 | 1/1997 | Suzuki | 361/685 |
| 5,654,874 | 8/1997 | Suzuki | 361/685 |
| 5,673,171 | 9/1997 | Varghese et al. | 361/685 |
| 5,858,509 | 1/1999 | Polch et al. | 428/166 |

*Primary Examiner*—Leo P. Picard
*Assistant Examiner*—Tung Minh Bui
*Attorney, Agent, or Firm*—Haynes and Boone LLP

[57] ABSTRACT

A portable computer includes a base portion having a hard disc drive bay formed therein and defined by first and second support surfaces. A hard disc drive is mounted on the first support surface of the bay. The drive has a first height and the bay has a second height, greater than the first height. A spacer is provided to engage surface portions of the hard disc drive and also to engage the second support surface of the bay for limiting flexing of the hard disc drive in response to an impact shock acting on the portable computer.

13 Claims, 6 Drawing Sheets

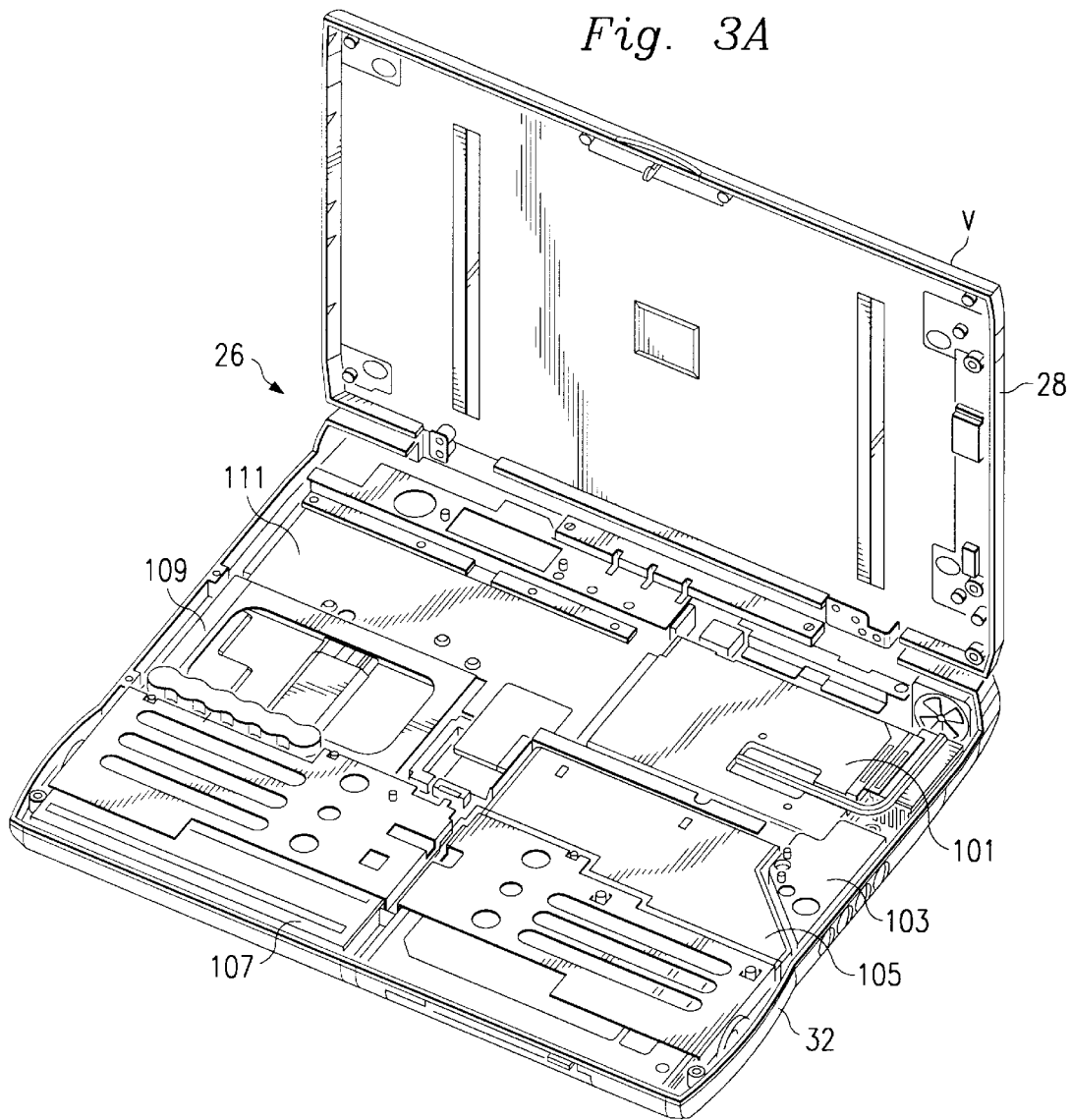

SHOCK ABSORBING SPACERS FOR PORTABLE COMPUTER HARD DISC DRIVES

BACKGROUND

The disclosures herein relate generally to portable computer hard disc drives and more particularly to an impact shock absorbing mounting apparatus and method for such hard drives.

Hard disc drives (HDD's) are one of the most common sources of field failures in computers. Within an HDD housing are several thin glass discs, i.e., magnetic media, each having an associated flying head. Thus, HDD's are one of the most fragile components of the computer in terms of sensitivity to impact. This is particularly true in cases where a major component of the impact forces is normal to the surface of the hard drive media. HDD's are more sensitive in this orientation because there is opportunity for read heads to come into physical contact with, and cause damage to the discs.

Upon impact, the heads bounce and contact the discs. The discs may be either broken or scored by such impact. Loose particles may also result from such impact and become free to move around inside the HDD cassette and contact other parts of the drive thus causing new failures. Furthermore, such impacts cause shock to the entire HDD cassette, not just to the heads.

Attempts to cushion the drives against shock from impact have produced elastomer feet on the bottom or rest surface for providing a cushioning effect of the portable computer housing on its associated support surface. These feet also serve as friction surfaces to limit lateral movement of the portable computer relative to its support surface. Cushioned mounts placed within the computer housing provide vibration damping but have not addressed the issue of where such mounts should be located to provide maximum protection from impact shocks. This is an important oversight because protection from the forces from impact shocks require an entirely different solution than protection from vibration.

When portable chassis are manufactured, a hard disc drive (HDD) bay is provided to accommodate larger HDD's, for example an 8 gig HDD having a thickness dimension of about 12.7 mm. Therefore when an HDD of that size is placed in the bay, there is little extra room left for the HDD to move upon impact shock because there is adequate mechanical support for the HDD. However, sometimes a smaller capacity HDD is provided, for example such as a 2–4 gig HDD having a thickness dimension of about 9.5 mm and inherently having less structural rigidity. When this occurs, there is an available 3.2 mm. of space which provides no mechanical support for the smaller thickness HDD. As a result, this leads to HDD failures when the system chassis is subjected to shock in the Z direction. This is particularly a problem when the head is away from the parked region, such as when the HDD is reading, writing or seeking, because these are the more fragile states of an HDD. During such unpact shock loads, the HDD chassis flexes away from the bottom or support surface of the system chassis and then returns to impact the support surface. This violent flexing and impact occur within a period of less than 2 ms, and is the single most damaging action to an HDD.

In U.S. Pat. No. 5,673,171, a mounting plate, representatively of a metal construction, is spaced apart from the support tray member top side portion in an overlying, parallel, facing relationship therewith, the mounting plate having a top side and a rear end portion. Fastening means are provided for securing the mounting plate to the support tray member top side portion. Additionally, resilient means are captively retained between the mounting plate and the support tray member top side portion and project downwardly beyond the support tray member to provide for handling shock absorption for a disc drive secured atop the mounting plate when the tray/plate assembly is, for example, placed on a support surface outside of the housing cage structure. Securing means are also provided and function to removably secure a disc drive to the top side of the mounting plate.

Therefore, what is needed is a method and apparatus for providing cushioned impact shock protection for smaller HDD's mounted in larger HDD bays in portable computers, which protection is strategically located to substantially reduce damage from impact forces acting normal to the bottom surface of the portable computer housing.

SUMMARY

One embodiment, accordingly, provides impact shock protection for smaller HDD's mounted in larger HDD bays in portable computers. To this end, a computer chassis comprises a base portion including an HDD bay formed therein and defined by peripheral support surfaces. An HDD is mounted in the bay. The HDD has a first height dimension and the bay has a second height dimension, greater than the first dimension. A spacer engages an edge portion of the HDD and engages at least one of the support surfaces of the bay.

A principal advantage of this embodiment is that smaller capacity HDD's can be mounted with a spacer in drive bays having a greater height dimension than the HDD. The spacer limits impact shock load effects on the HDD for limiting flexure of the undersized HDD and resulting impact on the HDD within the oversized bay.

BRIEF DESCRIPTION OF THE DRAWINGS

FIG. 3A is a perspective view illustrating an embodiment of a portable laptop computer having internal portions of the computer exposed.

DETAILED DESCRIPTION OF THE PREFERRED EMBODIMENT

Figure 1:
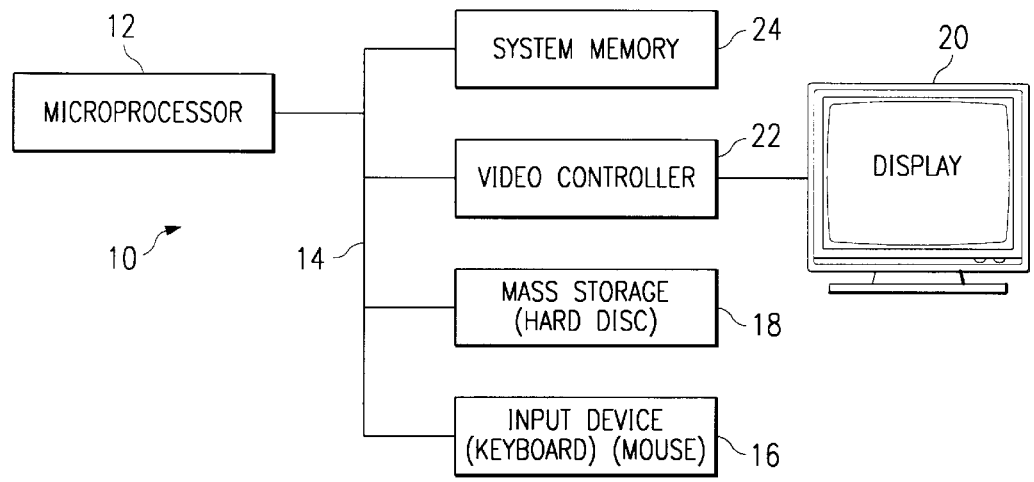
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
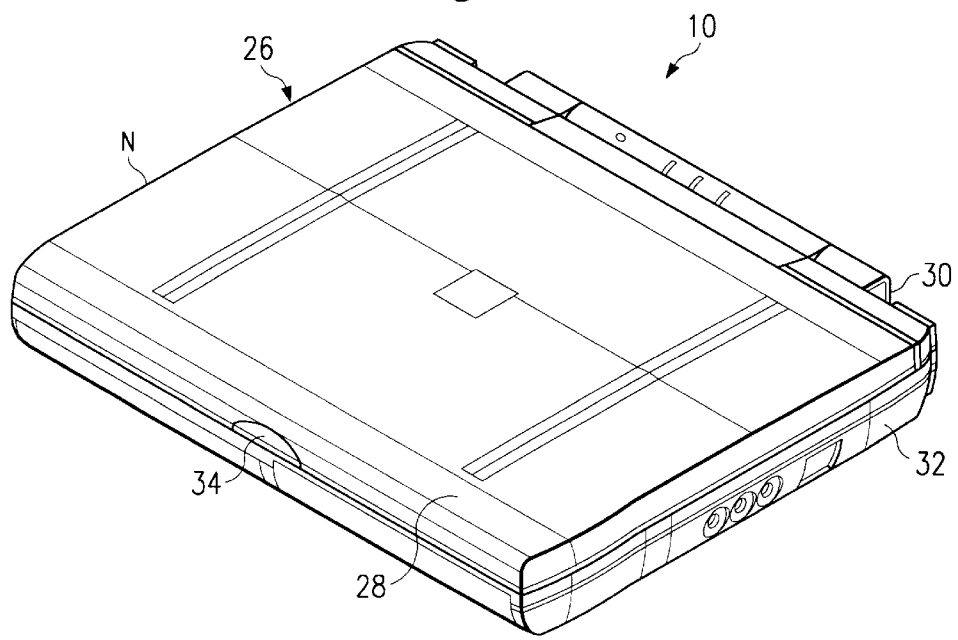
FIG. 2 is a perspective view illustrating an embodiment of a portable laptop computer having a lid in a closed position.
Figure 3:
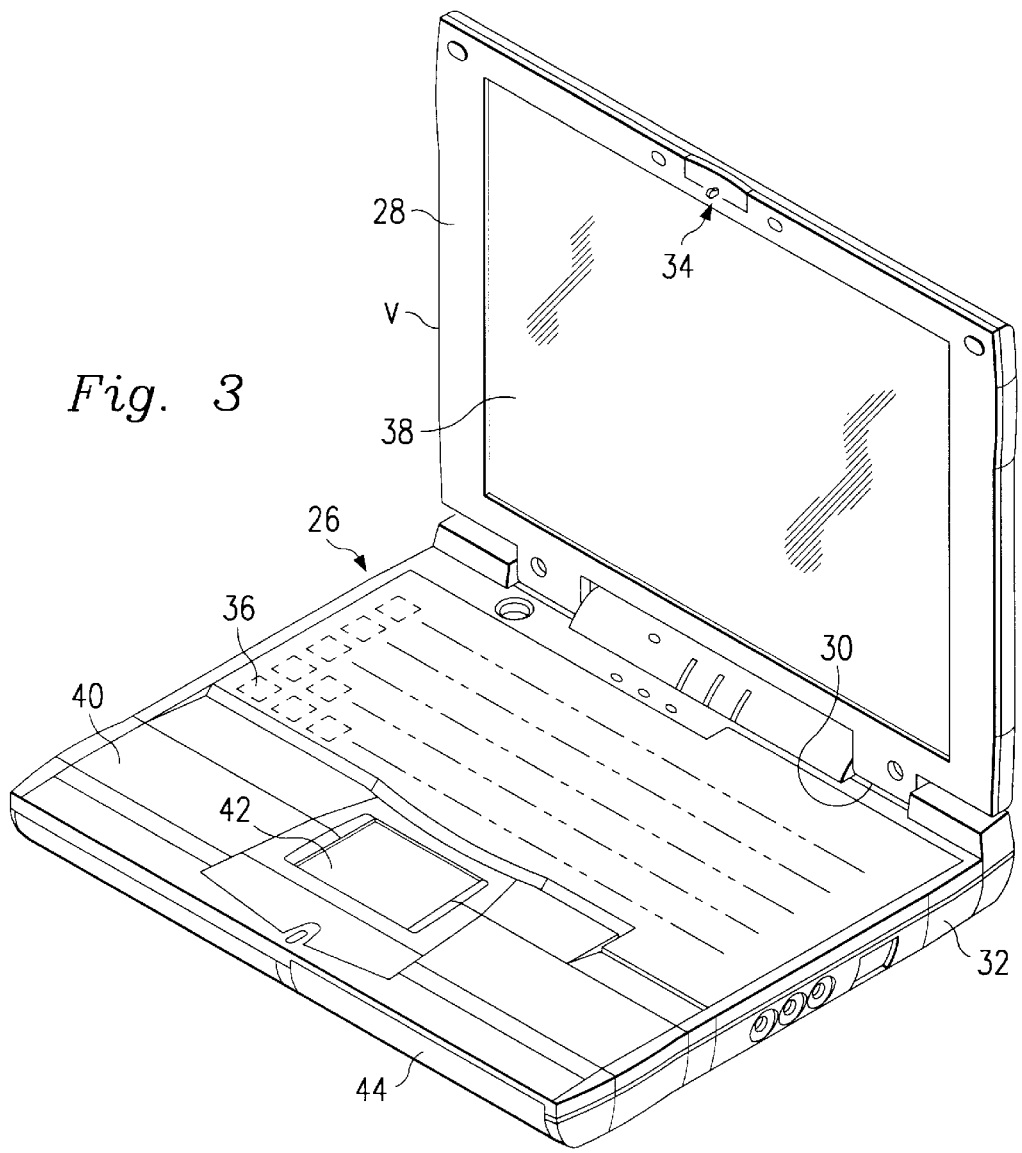
FIG. 3 is a perspective view illustrating an embodiment of a portable laptop computer having the lid in an open position.

Referring to FIG. 2, illustrated is a portable, notebook size computer designated 26 comprising a self-contained system, such as that illustrated at 10 in FIG. 1, and including a hinged top or lid 28 rotatable about a hinge or hinges 30 from a nested position "N," with a horizontal chassis base 32, to a substantially vertical or open position "V", FIG. 3. Opening of the notebook style portable computer by manipulation of a latch 34, reveals a plurality of keys 36 on base 32, and a monitor screen 38 mounted in lid or top 28. Base 32 includes a palm or wrist rest area 40 including a track pad 42 positioned above a battery housing 44 and adjacent keys 36.

Computer 26, FIG. 3A, illustrates the base 32 with the keys removed thus exposing some of the components mounted in base 32. Some of the components include a cooling section 101, an audio subsection 103, a CD floppy module section 105, a battery bay section 107, a hard-disk drive section 109, and a motherboard section 111. Top 28 is illustrated in the open position V and has the monitor screen 38 removed.

Figure 4:
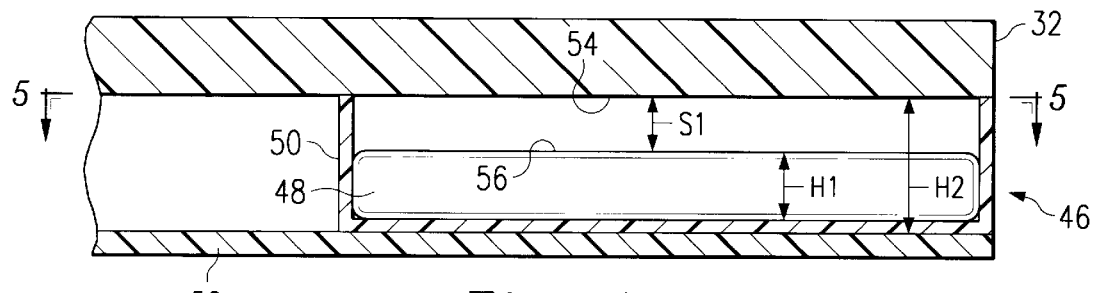
FIG. 4 is a cross-sectional side view diagrammatically illustrating an embodiment of a HDD in a carrier, inserted in a drive bay of a portable computer.

Computer chassis base 32, FIG. 4, includes an HDD bay 46 formed therein. An HDD 48 is mounted in a carrier 50 and the carrier 50 is supported by a first peripheral support surface 52 of base 32 and a second peripheral support surface 54 of base 32. The hard disc drive 48 is of a first height dimension H1 and the HDD bay 46 is of a second height dimension H2, which is greater than height dimension H1. Similarly, carrier 50 is of a height dimension which is substantially the same as height dimension H2 sufficient to permit carrier 50 to fit within HDD bay 46. Thus, the dimensions of carrier 50 permit either a smaller capacity HDD 48 or a larger capacity HDD, as discussed above, to be supported by carrier 50. However, when the smaller capacity HDD 48 is mounted in carrier 50, a substantial space S1 is created between a top surface 56 of HDD 48, and the second peripheral support surface 54 of base 32. Space S1 is created due to the difference in height between H2 and H1.

Figure 5:
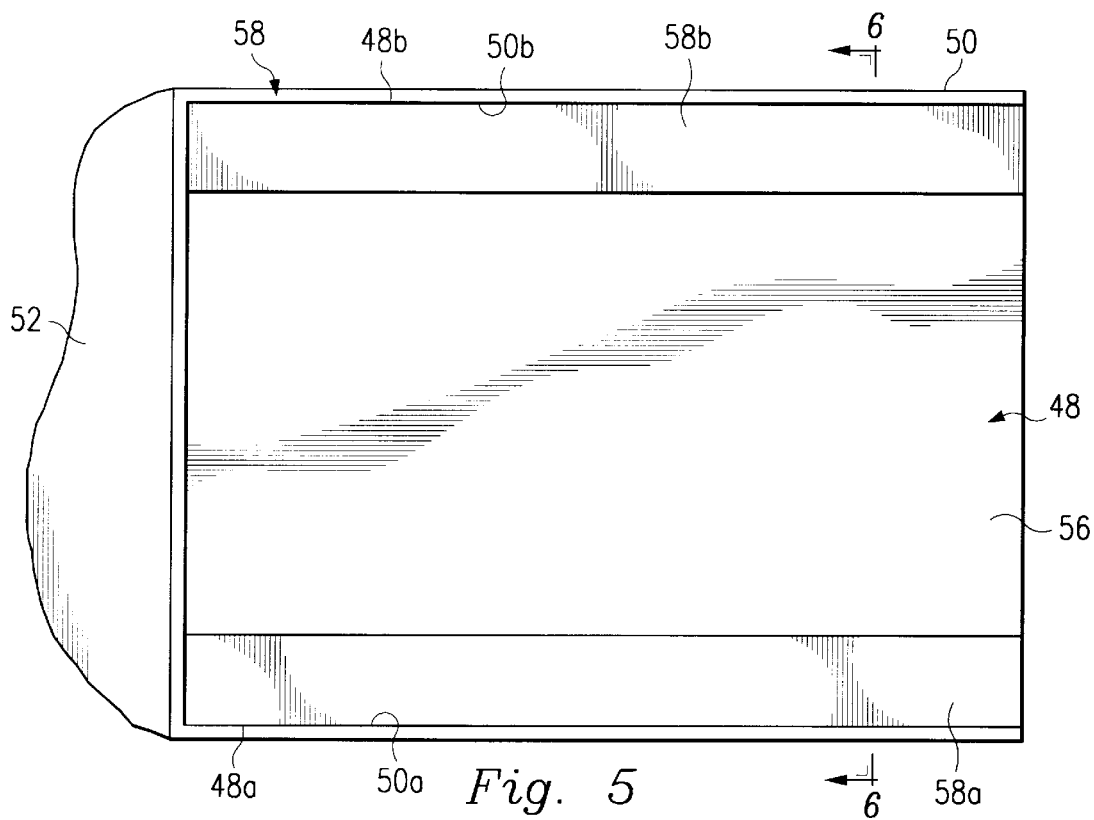
FIG. 5 is a view taken along the line 5—5 of FIG. 4.
Figure 6:
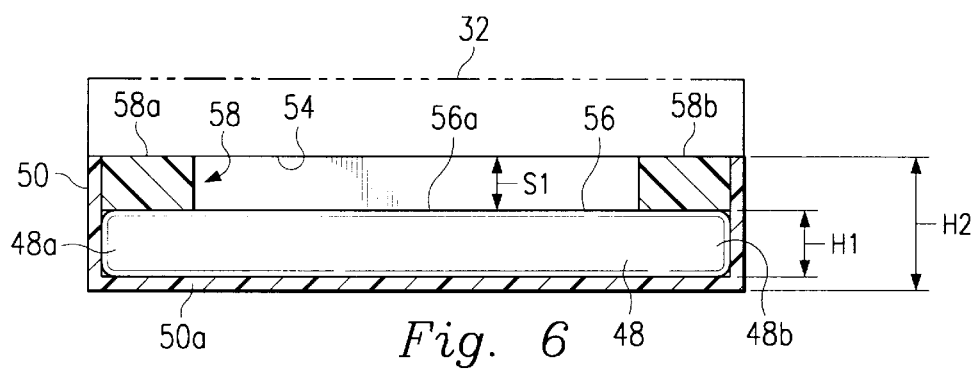
FIG. 6 is a view taken along the line 6—6 of FIG. 5.

In one embodiment, a shock transfer member in the form of a spacer 58, FIGS. 5 and 6, preferably of a solid plastic material, is seated in carrier 50. The spacer 58 may include a pair of strips 58a and 58b. Strips 58a and 58b are respectively supported along a portion of the top surface 56, preferably near the edge such as a first edge 48a and a second edge 48b of HDD 48 adjacent opposed side walls 50a and 50b of carrier 50. As such, strips 58a and 58b are substantially parallel to each other. Strips 58a and 58b extend from the first height dimension H1 to substantially the second height dimension H2. The shock transfer member or spacer 58 may be formed of any suitable solid, rigid material.

Figure 7A:
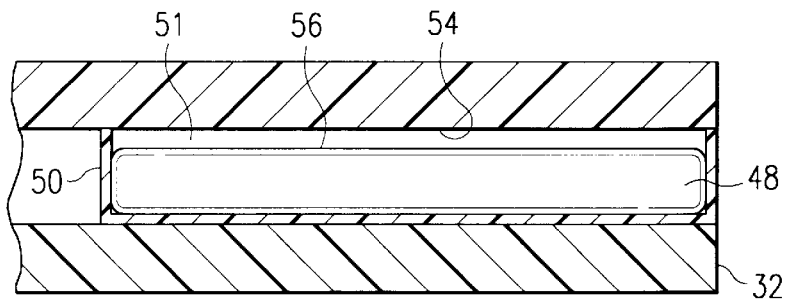
FIGS. 7a–7c are diagrammatic views sequentially illustrating HDD flexure resulting from a shock load in a prior art device.
Figure 7B:
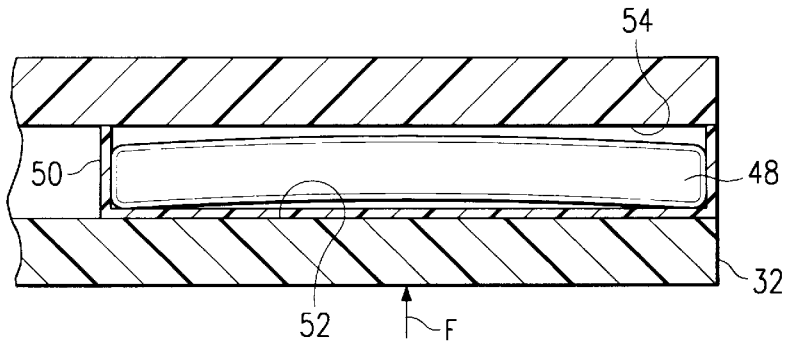
Figure 7C:
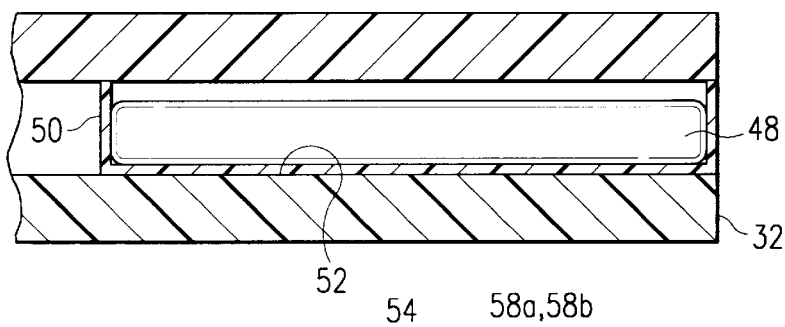

FIG. 7a illustrates that in the prior art, the space S1 exists between the surface 56 of HDD 48, and the second peripheral support surface 54 of base 32. FIG. 7b illustrates that a shock F or impact on base 32 causes HDD 48 to flex away from first peripheral surface 52 of base 32. This flexure can be sufficient to impact against second peripheral support surface 54 of base 32. FIG. 7c illustrates that a subsequent impact occurs when HDD 48 returns to contact first peripheral surface 52 of base 32.

The presence of spacer strips 58a and 58b, FIG. 6, retains HDD 48 seated in contact with a base member 50c of carrier 50 by filling a portion of space S1 along edges 48a and 48b of HDD 48, and second peripheral surface 54. The spacers 58a and 58b must have only edge contact with HDD 48 because no force or pressure may be exerted on a midportion 56a of surface 56 due to the interference with, or damage to, internal drive components.

With the strips 58a and 58b in place, as described above, space S1 exists only between the strips 58a and 58b, but not along edge portions 48a and 48b of HDD 48. Therefore, when a shock or impact on base 32 occurs, HDD 48 is not subjected to flexure and therefore, does not impact against second peripheral support surface 54 of base 32. It follows that there is therefore no subsequent return impact of HDD 48 against the first peripheral surface 52 of base 32.

Figure 8A:
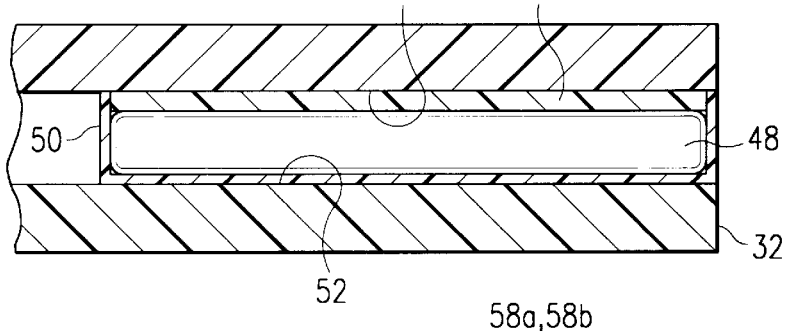
FIGS. 8a–8c are diagrammatic views sequentially illustrating an embodiment of spacers limiting the HDD flexure of FIGS. 7a–7c.
Figure 8B:
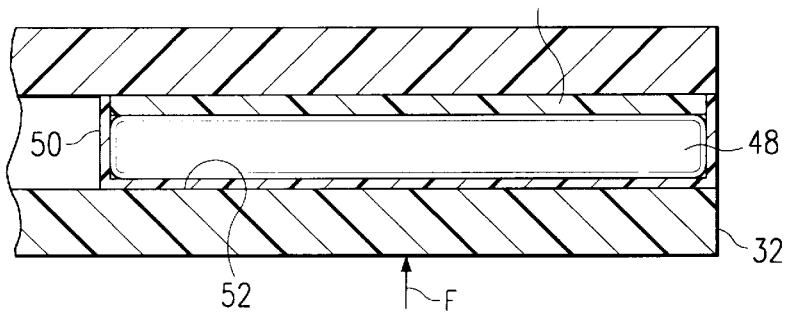
Figure 8C:
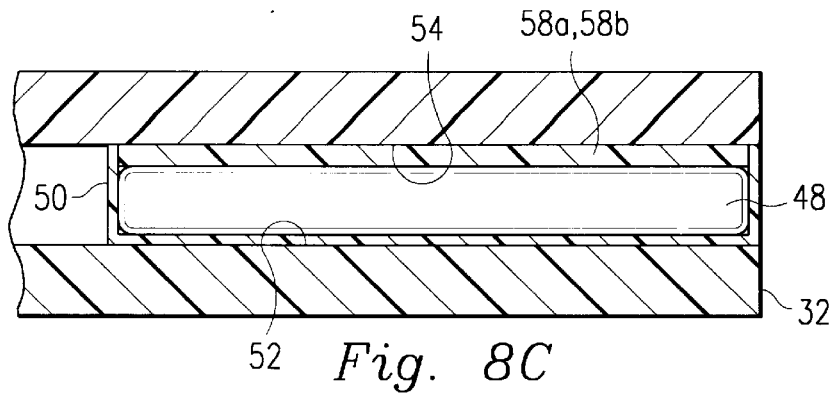

This is illustrated in operation in FIG. 8a where the spacers 58a and 58b are inserted between surface 56 of HDD 48 and second peripheral surface 54 of base 32. FIG. 8b illustrates that the shock F or impact on base 32 no longer causes HDD 48 to flex away from first peripheral surface 52 of base 32. Thus, in FIG. 8c, there is no subsequent impact of HDD 48 against the first peripheral surface 52 of base 32.

Figure 9:
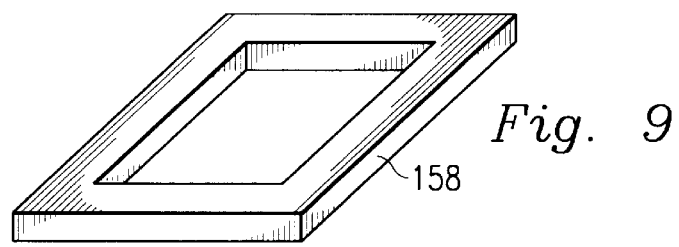
FIG. 9 is a perspective view illustrating another embodiment of a spacer.
Figure 10:
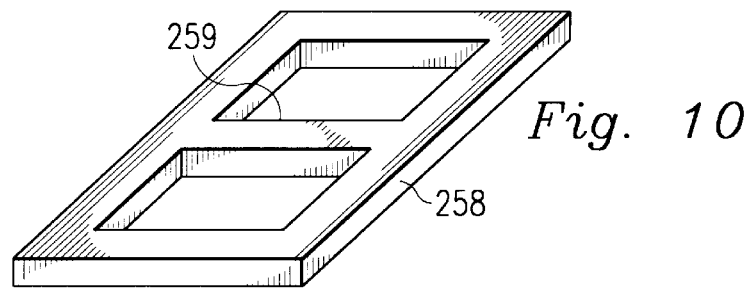
FIG. 10 is a perspective view illustrating another embodiment of a spacer.
Figure 11:
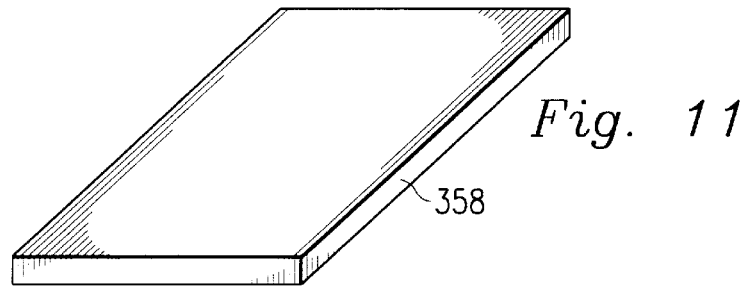
FIG. 11 is a perspective view illustrating another embodiment of a spacer.

Instead of spacer strips, a suitable spacer may be of other configurations such as a closed loop spacer 158, FIG. 9, a closed loop spacer 258, including a cross-bar 259, FIG. 10, and a solid plate spacer 358, FIG. 11. It should be kept in mind that these other configurations may be suitable for other HDD configurations. For example, in some HDD configurations it may be possible to provide spacer support at portions of top surface 56 other than the edge portions as discussed above.

As it can be seen, the principal advantages of these embodiments are that smaller capacity HDD's can be mounted with a spacer in drive bays having a greater height dimension than the HDD. The spacer limits impact shock load effects on the HDD for limiting flexure of the undersized HDD and resulting impact on the HDD within the oversized bay.

As a result, one embodiment provides a computer chassis comprising a base portion including a hard disc drive bay formed therein. The drive bay is defined by peripheral support surfaces. A hard disc drive is mounted in the drive bay and has a first height dimension. The drive bay has a second height dimension, greater than the first dimension. A spacer engages an edge portion of the disc drive and also engages at least one of the support surfaces of the bay.

Another embodiment provides a portable computer comprising a base portion including a hard disc drive bay formed therein and defined by first and second support surfaces. A hard disc drive is mounted on the first support surface of the drive bay. The disc drive has a first height dimension and the drive bay has a second height dimension, greater than the first height dimension. Spacer means are provided for engaging opposed edge portions of the disc drive and for engaging the second support surface of the bay for limiting flexing of the disc drive in response to an impact shock acting on the portable computer.

A further embodiment provides a computer system comprising a microprocessor and an input coupled to provide input to the microprocessor. A mass storage is coupled to the microprocessor. A display is coupled to the microprocessor by a video controller. A memory is coupled to provide storage to facilitate execution of computer programs by the microprocessor. A base chassis portion includes a hard disc drive bay formed therein and defined by peripheral support surfaces. A hard disc drive is mounted in the drive bay. The disc drive has a first height dimension and the drive bay has a second height dimension, greater than the first height dimension. A spacer engages an edge portion of the disc drive and is engaged with at least one of the support surfaces of the drive bay.

Another embodiment provides a method of supporting a hard disc drive in a computer chassis. A base portion of the computer chassis is provided with a hard disc drive bay formed therein which is defined by a first and a second support surface. A hard disc drive is inserted into the drive bay. The disc drive is supported on the first support surface so that a gap is defined between the disc drive and the second support surface. A spacer is inserted in the gap in engagement with opposite edge portions of the disc drive and with the second surface of the drive bay.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer chassis comprising:

a base portion including a drive bay formed therein, the drive bay being defined by peripheral support surfaces;

a hard disc drive mounted in the drive bay, the hard disc drive having a first height dimension and the drive bay, having a second height dimension, greater than the first dimension;

a shock transfer spacer engaging a surface of the hard disc drive and engaging at least one of the support surfaces of the drive bay;

the shock transfer spacer including at least a first strip and a second strip; and the first strip being mounted on a first edge of the hard disc drive and the second strip being mounted on a second edge of the hard disc drive, opposite the first edge.

2. The computer chassis as defined in claim 1 wherein the first and second strips are substantially parallel.

3. The computer chassis as defined in claim 1 wherein the first and second strips are formed of a solid plastic material.

4. A computer comprising:

a base portion including a drive bay formed therein, the drive bay being defined by peripheral support surfaces;

a hard disc drive mounted in the drive bay, the hard disc drive having a first height dimension and the drive bay having a second height dimension, greater than the first dimension;

a shock transfer spacer engaging a surface of the hard disc drive and engaging at least one of the support surfaces of the drive bay;

the hard disc drive being mounted in a carrier, the carrier having a carrier height dimension substantially the same as the second height dimension;

the shock transfer spacer including at least a first strip and a second strip; and the carrier having side walls extending substantially to the second height dimension, the first and second strips being adjacent the opposite side walls, respectively, and extending from the first height dimension substantially to the second height dimension.

5. A portable computer comprising:

a base portion including a drive bay formed therein and defined by first and second support surfaces;

a hard disc drive mounted on the first support surface of the drive bay, the hard disc drive having a first height dimension and the drive bay having a second height dimension, greater than the first height dimension;

shock transfer means for engaging a surface portion of the hard disc drive and for engaging the second support surface of the drive bay for limiting flexing of the hard disc drive in response to an impact shock acting on the portable computer;

the hard disc drive being mounted in a carrier, the carrier having a carrier height dimension substantially the same as the second height dimension;

the shock transfer means including at least a first strip and a second strip; and the carrier having opposite side walls extending substantially to the second height dimension, the first and second strips being adjacent the opposite side walls, respectively, and extending from the first height dimension substantially to the second height dimension.

6. The portable computer as defined in claim 5 wherein the first and second strips are formed of a solid plastic material.

7. A computer system comprising:

a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a base chassis portion including a drive bay formed therein and defined by peripheral support surfaces;

a hard disc drive mounted in the drive bay, the hard disc drive having a first height dimension and the drive bay having a second height dimension greater than the first height dimension;

a shock transfer member engaging a surface of the hard disc drive and being engaged with at least one of the support surfaces of the drive bay;

the shock transfer member includes a first portion and a second portion; and the first portion being mounted on a first edge of the hard disc drive and the second portion being mounted on a second edge of the hard disc drive, opposite the first edge.

8. The computer system as defined in claim 7 wherein the disc drive is mounted in a carrier, the carrier having a carrier height dimension substantially the same as the second height dimension.

9. The computer system as defined in claim 7 wherein the first and second portions are formed of a solid plastic material.

10. The computer system as defined in claim 1 wherein the shock transfer member is formed by a rigid material.

11. The computer system as defined in claim 1 wherein the shock transfer member is formed of a solid material.

12. The computer system as defined in claim 8 wherein the carrier has opposite side walls extending substantially to the second height dimension, the first and second portions being adjacent the opposite side walls, respectively, and extending from the first height dimension substantially to the second height dimension.

13. A method of supporting a hard disc drive in a computer chassis comprising the steps of:

providing a base portion of the computer chassis with a drive bay formed therein and defined by a first and a second support surface;

inserting a hard disc drive in the drive bay;

supporting the hard disc drive on the first support surface so that a gap is defined between the hard disc drive and the second support surface;

forming a shock transfer member with at least a first portion and a second portion; and inserting the first and second portions of the shock transfer member in the gap in engagement with opposite edge portions of the hard disc drive and the second surface of the drive bay.

* * * * *

UNITED STATES PATENT AND TRADEMARK OFFICE
CERTIFICATE OF CORRECTION

PATENT NO.    : 6,122,164
DATED         : September 19, 2000
INVENTOR(S)   : Reynold Liao and Sean O'Neal It is certified that error appears in the above-identified patent and that said Letters Patent is hereby corrected as shown below:

Column 7,
Line 4, please delete "claim 1" and insert therefor -- claim 7 --.
Line 6, please delete "claim 1" and insert therefor -- claim 7 --.

Signed and Sealed this

Twenty-second Day of October, 2002

*Attest:*

*Attesting Officer*

JAMES E. ROGAN
*Director of the United States Patent and Trademark Office*